United States Patent [19]

Sapsowitz

[11] 3,862,338

[45] Jan. 21, 1975

[54] CAST CHEWING GUM PRODUCT AND METHOD OF MAKING THE SAME

[75] Inventor: Melvin L. Sapsowitz, Clarks Summit, Pa.

[73] Assignee: Topps Chewing Gum, Incorporated, Brooklyn, N.Y.

[22] Filed: Oct. 3, 1973

[21] Appl. No.: 403,152

Related U.S. Application Data

[63] Continuation-in-part of Ser. No. 170,634, Aug. 10, 1971, abandoned.

[52] U.S. Cl. .......................................... 426/3, 426/5
[51] Int. Cl. ............................ A23g 3/30, A23g 3/00
[58] Field of Search ...................................... 426/3, 5

[56] References Cited
UNITED STATES PATENTS

| | | | |
|---|---|---|---|
| 2,438,551 | 3/1948 | Fenimore | 426/3 |
| 3,208,405 | 9/1965 | Beer | 426/5 |
| 3,262,784 | 7/1966 | Bucher | 426/5 |

*Primary Examiner*—Samih N. Zaharna
*Assistant Examiner*—J. M. Hunter
*Attorney, Agent, or Firm*—Mark T. Basseches; Paula T. Basseches

[57] ABSTRACT

The present invention is directed to a method of manufacturing a cast chewing gum product and to the resultant article. In accordance with the invention, a chewing gum formulation is employed in which at least about half of the total added sugar components comprise dextrose and sucrose and wherein at least about 6 percent of the total sugar content comprises dextrose. It has been discovered that an otherwise essentially conventional gum formulation wherein the ratio of dextrose to total sugar is at least about 6 percent by weight is sufficiently liquid within a temperature range of about 70°C to about 100°C to permit formation by casting in appropriately configurated forms.

The invention is further directed to a cast gum product manufactured in accordance with the noted method, such gum product having unique "chew" and shelf life characteristics, as well as being susceptible of being economically formed into intricate patterns, shapes and configurations.

3 Claims, No Drawings

CAST CHEWING GUM PRODUCT AND METHOD OF MAKING THE SAME

This application is a continuation in-part of application Ser. No. 170,634, filed Aug. 10, 1971 now abandoned.

BACKGROUND OF THE INVENTION

1. Field of the Invention

The present invention is in the field of chewing gum products, and more specifically relates to a method for making cast chewing gum and the resultant article.

The term "chewing gum" as employed herein should be understood to encompass bubble gum.

2. The Prior Art

It is commonplace to provide candy formulations which, in the course of manufacture, are heated so as to render them sufficiently liquid to be poured into molds and cast. In the course of such processing, the liquid confection takes on the shape of the form and retains the same after cooling. Satisfactory forms for shaping cast confections have been fabricated of a variety of materials, including starch compositions having shaped cavities formed therein, metallic trays incorporating suitable depressions, and thermoplastic sheets which have been vacuum formed to define desired cavities. In the latter case, the confection components may be removed from the cavities or, alternatively, the vacuum formed sheets may be used as a part of the packaging.

It is also suggested in U.S. Pat. No. 3,208,405 to provide a chewing gum formulation having a high percentage of invert sugar which may be heated until it reaches a liquid or near liquid state. The patent suggests that the liquid mass may be extruded as a filling surrounded by a hard candy mass. The cooled gum product, while possibly adequate for use within a core of hard candy, is extremely soft and non-shape retaining and, hence, unsatisfactory in its chew and shape retaining characteristics to be marketed except as a core of a hard candy item.

As is further known, chewing gum materials have been sold in a wide variety of shapes and sizes. However, it has heretofore been considered impossible commercially to cast chewing gum products from a liquid.

While it is known that gum formulations soften under heat, the problem heretofore experienced is that, upon resolidification of a heated formulation including substantial amounts of sucrose, the cooled mass will be found to have lost its desirable chew and other characteristics. Thus, while experimentally gum formulations have been heated to the liquid condition and cast to define attractive gum portions having shapes which cannot economically be achieved by conventional forming methods, such as extruding, slicing, etc., the chew, flavor and shelf life characteristics of such gum portions vary so significantly from the expected, conventional characteristics as to render the same unsaleable to purchasers seeking an ordinary gum product. More particularly, the resultant gum product will have a hardness more characteristic of hard candy than of chewing gum.

SUMMARY OF THE INVENTION

The present invention is predicated upon the discovery that a sucrose containing chewing gum formulation of otherwise essentially conventional parameters but wherein dextrose comprises at least about 6 percent of the total sugar content may be heated to a degree required to form a castable liquid, and thereafter cast in molds or the like, the resultant product having highly desirable and, indeed, unique chewing characteristics. Additionally, the various forms of degradation heretofore mentioned are not experienced and the resultant product will be found to have improved shelf life, reduced sensitivity to oexidative deterioration and flavor loss.

In accordance with the invention, the formulation as set forth is rendered sufficiently liquid for casting by heating the same to temperatures in the range of from about 70°C to about 100°C, and thereafter cast by pouring or depositing the latter in a desirably shaped die cavity of permanent or temporary nature.

Preferably, the heated mixture is continuously mixed prior to deposition in the molds.

After cooling, the resultant product will be found to have unique chew characteristics, as contrasted with the identical gum formulation processed by conventional methods, i.e., without liquefication. In contrast, conventional gum formulations not incorporating the noted dextrose content, when heated to liquefying temperatures sufficient to permit casting, will upon cooling be found to exhibit multiple undesirable characteristics, including a hard, almost brittle chew consistency, and will be readily susceptible to volatilization of the flavor, color additives and to oxidative deterioration.

Without limitation as to any specific theory, it is believed that the presence of dextrose in minor qualtities of as little as about 6 percent by weight of the total sugar content has the effect of dramatically reducing the temperature at which the gum formulation will be sufficiently liquid for casting, thus permitting the use of a sucrose containing formulation without subsequent hardening on cooling.

It is further believed that the high heat factor required to liquefy conventional gum formulations not incorporating the noted quantities of dextrose is the agency which causes the undesirable chew, volatilization and deterioration effects.

By way of example, a gum formulation in which the sugar component is at least about 6 percent by weight dextrose in an otherwise sucrose dominated formulation will be sufficiently liquid for casting at about 85°C, whereas comparable flow characteristics will not be achieved, with the elimination of the dextrose ingredient, until the otherwise identical formulation is heated to about a temperature of 120°C.

The article has unique properties as contrasted with chewing gum products heretofore known and, indeed, differs from the same chewing gum formulation when the latter is processed by conventional methods.

Specifically, the cast gum product of the present invention is characterized by the presence of a ductile external coating or skin encapsulating a matrix, which matrix has chew characteristics reminiscent of a fine nougat. The matrix is noted to be considerably less resilient than the same formulation conventionally processed upon initial chew, the mass, after hydration, having identical chew characteristics to the conventionally processed gum.

In contrast to the conventionally processed material, hydration takes place much more rapidly and, for example, in a bubble gum formulation the material is in the desired condition with substantially lesser amounts of mastication than conventionally processed gum.

The cast gum product exhibits certain other unique characteristics, including greater shelf life with less flavor loss. In addition, whereas conventionally processed gum, upon storage for protracted periods, will assume a homogeneous, embrittled characteristic, only the coating of the cast gum product tends to become changed to a somewhat tougher consistency, the interior or matrix portion retaining its highly desirable nougat-like chew characteristic.

It is accordingly an object of the invention to provide a method of manufacturing a chewing gum product fabricated by casting a liquid.

A further object of the invention is to provide a cast gum article through the use of the process having unique chew and shelf life properties.

Still a further object of the invention is the provision of a method of casting a chewing gum formulation liquefied by heating, the sugar content of which gum formulation includes sucrose and at least 6 percent by weight of dextrose, the incorporation of even the minimum quantity of dextrose having the property of permitting the composition to melt at relatively low temperatures, i.e., within the range of about 70°C to 100°C.

The molten mass may be cast in dies or molds of any conventional sort, the resultant product having the unique chew characteristics noted above, the product, in addition, exhibiting improved shelf life characteristics.

Referring now more specifically to the method and article, there is provided, by way of example, a chewing gum formulation incorporating the following ingredients, the percentages indicated in the formulation signifying amounts by weight.

| Corn syrup (about 44 ½° Be) 42-43 | |
|---|---|
| dextrose equivalent | 24% |
| invert sugar | 1.6% |
| sucrose | 57 to 0% |
| dextrose | 3 to 60% |
| gum base | 13.3% |
| glycerine | 0.3% |
| flavoring | 0.4% |
| color solution | 0.4% |

In the noted formulation, it will be appreciated by those skilled in the art that the corn syrup component includes quantities of dextrose as well as other sugars. Thus, in computing the ratio of dextrose to total sugars, it is necessary to take into account the total sugar content of the corn syrup as well as the dextrose content thereof. Corn syrups differ markedly in their constituency and it is therefore desirable, especially where large amounts of pure dextrose are not added, carefully to consider the constituency of the syrup ingredient.

In the illustrated formulation the syrup is comprised of 83 percent solids and 17 percent water, 20 percent by weight of the solid components comprising dextrose.

The particular gum base selected is not critical and various known gum bases have been satisfactorily employed. By way of example, a satisfactory gum base formulation is as follows, the parts in all instances being indicated by weight.

| butadiene-styrene copolymer | 9.3 |
|---|---|
| pentaerythritol ester of refined wood rosin | 9.5 |
| glycerol ester of hydrogenated rosin | 38.8 |
| calcium carbonate | 25 |
| paraffin wax | 3.4 |
| microcrystalline wax | 8.8 |
| glycerol monostearate | 5.2 |

A further satisfactory gum base is as follows, also expressed in terms of parts by weight.

| massaranduba balata | 16.0 |
|---|---|
| lechi caspi | 10.0 |
| butadiene-styrene copolymer | 1.9 |
| natural rubber | 1.6 |
| glyceryl ester of partially dimerized rosin | 5.6 |
| glycerol ester of hydrogenated rosin | 19.2 |
| calcium carbonate | 21.2 |
| paraffin wax | 14.1 |
| lanolin | 0.5 |
| hydrogenated vegetable oil | 1.3 |
| glycerol monostearate | 1.0 |
| Starch | 2.6 |
| microcrystalline wax | 5.0 |

Conventional variations in base formulation in order to render the final product suitable for use as a bubble gum may be employed in the practice of the instant method and the formulation of the resultant article.

The composition is prepared for casting by placing the same in a conventional steam-jacketted mixer or equivalent combined heating and mixing apparatus, which apparatus, by way of example, may be a double armed, steam-jacketted Sigma blade mixer as manufactured by Baker-Perkins Company among others. The product is blended and brought to the minimum temperature required to render the mass of a sufficiently low viscosity to conform to the configuration of the particular mold to be employed in the casting operation.

Attempts have been made to derive empirical values for a desirable casting viscosity. However, the use of known viscosity techniques have been found unsuitable, due to the non-Newtonian properties of the mass.

It will be appreciated in this connection that the desired viscosity may vary in accordance with the intricacy of the mold to be employed, i.e., where the mold incorporates substantial quantities of fine detail, a somewhat lower viscosity may be desired than in situations where the mold defines simple shapes without substantial detail.

In view of the difficulties in prescribing specific viscosities, it is best to describe the desired viscosity in terms of the temperature to which a given formulation should be heated to conform with a given set of mold parameters. In this context, it has been found desirable to avoid over-heating the mass to obtain a viscosity below that required for casting.

By way of example, and utilizing the above noted formulation, varying merely the proportion of dextrose to total sugars, a sufficiently low viscosity for casting of even intricate shapes is achieved at 70°C where the sucrose component is omitted entirely and the higher dextrose concentration substituted. At the other extreme and employing a formulation utilizing a maximum of 57 percent sucrose and 3 percent dextrose, the desired viscosity is achieved by raising the temperature of the mass to between 85°C and 100°C.

In contrast, where the dextrose concentration of the formulation drops below about 6 percent by weight of the total sugars, the formulation would require raising the temperature of the mass to about 120°C to achieve a viscosity sufficiently low for adequate casting of even a relatively simple shape.

As previously noted, in formulations wherein sucrose exceeds about 94 percent of the total sugars present, the cast product, in addition to being liquid only at high temperatures, will be found to exhibit an exceedingly hard and brittle chew characteristic reminiscent of a hard candy. Additionally, volatilization of the flavor and coloring ingredients and substantial oxidative deterioration may be experienced. On the other hand, formulations which incorporate at least about 6 percent destroxe may be liquefied and cast without exhibiting the noted undesirable properties.

Where sucrose comprises about 90 percent and dextrose about 10 percent of the total sugars present, suitable viscosity is achieved at about 82°C. Where the percentage of dextrose in the sugars is increased to about 20 percent, suitable viscosities are achieved at about 75°C. Where 30 percent or more of the total sugar content is comprised of dextrose, suitable viscosities may be achieved at 73°C or below.

The liquified gum formulation is preferably constantly agitated when it is at or near its desired minimum viscosity since there is a tendency toward phase separation, an article cast from such phase separated mass exhibiting a crusty whitish coating which readily flakes from the main body of the material.

The continuously mixed liquid material is deposited into the desired molds, dies, forms, vacuum formed sheets or the like by any conventional mechanism capable of maintaining the latter at the desired temperature. By way of example, satisfactory deposition has been obtained through the use of dispersion feed depositors, with or without suction, auger feed depositors and various other forms of modified candy processing apparatuses.

The finished cast article has been determined to have a slightly greater density than a gum article manufactured by conventional forming steps. Thus, utilizing the above formulation processed by conventional methods, a density of approximately 1.3 grams per cc will be achieved, whereas the cast article fabricated from a poured heated mass will have a density of about 1.45 grams per cc. In view of the greater density of the cast product, the lighter initial chew characteristic, referred to as "nougat-like", is even more surprising since, generally, chew resistance is expected to increase with density.

As will be recognized by a skilled worker in the art, the gum formulation given above is generally considered a formulation for children, incorporating a somewhat higher percentage of sugars and lower percentage of gum base than is customary in adult chewing gum products. For so-called adult chewing gum, the proportion of gum base may be increased to constitute about 20 percent of the total weight of the formulation. Such modification has been found to require an increase in the temperature required to render the mass sufficiently liquid for casting. As the ratio of sucrose to dextrose is increased, where the adult formulation is employed, progressively higher temperature differentials are required, as contrasted with the children's formulation, to achieve comparable apparent flow properties or viscosities.

As will be apparent from the foregoing, the present invention is predicated in part upon the discovery that the addition of as little as about 6 percent of dextrose in the added sugar ingredients has the unexpected effect of dramatically lowering the temperature at which an otherwise essentially conventional gum formulation may be reduced to a sufficiently low viscosity state to permit the casting thereof without undesirably affecting the end product.

In contrast, and in the absence of the noted quantity of dextrose, the higher sucrose gum formulation must be heated to about 120°C for a children's formulation, to 145°C for an adult gum, to achieve a satisfactory casting viscosity. However, the product resulting from the casting of a gum formulation to such degree exhibits, as noted above, brittleness, volatilization of the flavoring and coloring used, oxidative deterioration and reduced shelf life characteristics.

The invention is further considered to reside in the totally unexpected discovery that the formulation when processed by casting has properties which differ drastically from the same formulation when conventionally fabricated.

No claim for novelty is made herein to the gum formulation per se, the novel phases of the present invention being considered to reside in the method of processing the formulation, in the discovery that critical minimum quantities of dextrose in such formulation have the unexpected property of drastically reducing the heat required to melt the material, and in the discovery that a portion formed by casting has unique and desirable characteristics not found in conventionally fabricated gum.

As noted, the present invention is directed to a cast product and method including a casting step. The word "cast" as used herein is intended to relate to a procedure in which the gum formulation is heated to bring it to a sufficiently low viscosity to permit it to conform to the mold or shaping cavity employed, without the necessity of applying forces to the mass, (although, of course, such forces may be applied), the temperature required in conjunction with the illustrated formulation being in the range of from about 70°C to about 100°C.

The product resulting from the process differs in its essential physical characteristics from chewing gum products heretofore known although of the same formulation. Without limitation, the step of heating the mass to a temperature sufficient to render the same adequately fluid for casting purposes is considered to be the agency which effects the change in physical characteristics, notably the yieldable external coating, nougat-like initial chew, rapid hydration, and long shelf life.

The term "casting" as used herein shall be interpreted to include rendering the mass molten by heating as set forth hereinabove, hardening and subsequently processing.

Having thus described the invention and illustrated its use, what is claimed as new and is desired to be secured by Letters Patent is:

1. A method of making a cast chewing gum product which includes the steps of preparing a chewing gum formulation comprising gum base, flavoring and an added sugar component, at least about 50 percent by weight of said added sugar component comprising dextrose and sucrose, the amount of dextrose in said added sugar component being at least about 6 percent of the total sugar content, intimately mixing said ingredients, heating said formulation to a temperature above about 70°C and not exceeding about 100°C, thereby to liquefy said formulation, thereafter depositing said heated liquid formulation into shaping cavities, and thereafter cooling said liquid material in said cavities.

2. A molded chewing gum comprising an intimate admixture of gum base, flavoring and added sugar components, said sugar components being comprised of at least about 50 percent by weight dextrose and sucrose, the proportion of dextrose in said added sugar components being at least about 6 percent by weight dextrose, said gum being formed by the process of claim 1 and having an integral, yieldable surface skin or coating surrounding a cohesive, nougat-like interior.

3. A method of making a cast chewing gum product comprising preparing a chewing gum formulation comprising gum base, flavoring and an added sugar component, said added sugar component consisting essentially of dextrose and sucrose and including at least about 6 percent dextrose, heating said formulation to a temperature above about 70°C and not exceeding about 100°C. to form a liquid material of suitably low viscosity for casting, depositing said heated liquid material into shaping cavities, and thereafter permitting said liquid material to cool, said heating step being carried out at said temperatures to avoid embrittlement of the cooled cast resultant product at room temperatures.

* * * * *